(12) United States Patent
Garner et al.

(10) Patent No.: US 11,794,538 B2
(45) Date of Patent: *Oct. 24, 2023

(54) MULTI-POINT UNDERBED HITCH MOUNTING SYSTEM

(71) Applicant: HORIZON GLOBAL AMERICAS INC., Plymouth, MI (US)

(72) Inventors: Kevin Garner, Swartz Creek, MI (US); Matt Dunlavey, Ann Arbor, MI (US); Erik Fritz, New Boston, MI (US); Brian Ward, Swartz Creek, MI (US)

(73) Assignee: HORIZON GLOBAL AMERICAS INC., Plymouth, MI (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/222,256

(22) Filed: Apr. 5, 2021

(65) Prior Publication Data

US 2021/0221188 A1    Jul. 22, 2021

Related U.S. Application Data

(63) Continuation of application No. 15/909,236, filed on Mar. 1, 2018, now Pat. No. 10,967,688.

(Continued)

(51) Int. Cl.
*B60D 1/48*   (2006.01)
*B60D 1/01*   (2006.01)
*B60D 1/24*   (2006.01)

(52) U.S. Cl.
CPC ............ *B60D 1/488* (2013.01); *B60D 1/015* (2013.01); *B60D 1/247* (2013.01)

(58) Field of Classification Search
CPC ......... B60D 1/488; B60D 1/015; B60D 1/247
See application file for complete search history.

(56) References Cited

U.S. PATENT DOCUMENTS

| 1,958,723 A | 5/1934 | Spencer |
| 1,996,162 A | 4/1935 | Lubbers |

(Continued)

FOREIGN PATENT DOCUMENTS

| DE | 2121876 | 4/1971 |
| EP | 0038928 B1 | 4/1981 |

(Continued)

OTHER PUBLICATIONS

Cequent Towing Products, Inc., Installation Instructions Mounting Kit Ford F250/F350/F450 LD/HD/SD 6' & 8' Beds, Dec. 13, 2006, pp. 1-11, Litho in USA.

(Continued)

*Primary Examiner* — Tony H Winner

(57) ABSTRACT

An under bed hitch mounting apparatus is shown and described. The under bed hitch mounting apparatus may comprise a first bracket attachable to a frame of a vehicle below a load bed of the vehicle and a second bracket attachable to the frame of the vehicle below a load bed of the vehicle, the second bracket transversely spaced from the first bracket. The under bed hitch mounting apparatus may also include a first receiving member attached with the first bracket, the first receiving member configured to engage an accessory member, where at least a portion of the first receiving member extends above the load bed of the vehicle, and a second receiving member attached with the second bracket, the first receiving member configured to engage the accessory member, where at least a portion of the second receiving member extends above the load bed of the vehicle.

19 Claims, 6 Drawing Sheets

Related U.S. Application Data

(60) Provisional application No. 62/465,353, filed on Mar. 1, 2017.

(56) References Cited

U.S. PATENT DOCUMENTS

| | | |
|---|---|---|
| 2,027,990 A | 1/1936 | Lubbers |
| 2,041,124 A | 5/1936 | Francis |
| 2,289,079 A | 7/1942 | Seyferth |
| 2,507,616 A | 5/1950 | Stephen |
| 2,513,117 A | 6/1950 | Stephen |
| 2,543,749 A | 3/1951 | Walther |
| 2,610,069 A | 9/1952 | Ketel |
| 2,621,056 A | 12/1952 | Kayler |
| 2,680,627 A | 6/1954 | Johnson et al. |
| 2,749,144 A | 6/1956 | Kayler |
| 2,778,657 A | 1/1957 | Chaplin |
| 2,779,605 A | 1/1957 | Braunberger |
| 2,799,516 A | 7/1957 | Greenway |
| 2,809,851 A | 10/1957 | Beck |
| 2,819,096 A | 1/1958 | Sencenich |
| 2,856,203 A | 10/1958 | Kayler |
| 2,860,891 A | 11/1958 | Ramun |
| 2,900,194 A | 8/1959 | De Lay |
| 2,925,286 A | 2/1960 | Hodges, Jr. et al. |
| 2,977,137 A | 3/1961 | Durham |
| 2,985,463 A | 5/1961 | Geerds |
| 3,073,624 A | 1/1963 | Thomas |
| 3,112,936 A | 12/1963 | Cole et al. |
| 3,170,716 A | 2/1965 | Walther et al. |
| 3,171,672 A | 3/1965 | Dalton |
| 3,198,549 A | 8/1965 | Martin |
| 3,220,750 A | 11/1965 | Mead |
| 3,318,616 A | 5/1967 | Fontaine et al. |
| 3,336,051 A | 8/1967 | Dale |
| 3,402,944 A | 9/1968 | Day |
| 3,584,899 A | 6/1971 | Gottler et al. |
| 3,595,125 A | 7/1971 | Jacobs |
| 3,606,384 A | 9/1971 | Fontaine et al. |
| 3,630,545 A | 12/1971 | Fontaine et al. |
| 3,640,549 A | 2/1972 | Neff et al. |
| 3,746,369 A | 7/1973 | Neff et al. |
| 3,844,584 A | 10/1974 | Fontaine |
| 3,847,414 A | 11/1974 | Madura |
| 3,861,709 A | 1/1975 | Mulcahy et al. |
| 3,888,514 A | 6/1975 | Klein |
| 3,893,710 A | 7/1975 | Madura |
| 3,941,407 A | 3/1976 | Breford |
| 4,017,095 A | 4/1977 | Best |
| 4,029,335 A | 6/1977 | Cady et al. |
| 4,039,087 A | 8/1977 | Sandvick, Sr. |
| 4,134,601 A | 1/1979 | Propst |
| 4,429,892 A | 2/1984 | Frampton et al. |
| 4,477,100 A | 10/1984 | Elyakim |
| 4,505,344 A | 3/1985 | Hobbs et al. |
| 4,531,774 A | 7/1985 | Whatley |
| 4,614,355 A | 9/1986 | Koch |
| 4,721,323 A | 1/1988 | Czuk et al. |
| 4,856,804 A | 8/1989 | Nash |
| 4,892,324 A | 1/1990 | Spencer et al. |
| 4,921,266 A | 5/1990 | Beals |
| 4,928,987 A | 5/1990 | Hunger |
| 4,946,183 A | 8/1990 | Benson et al. |
| 4,960,288 A | 10/1990 | Chambers |
| 4,962,945 A | 10/1990 | Vannoy et al. |
| 5,044,651 A | 9/1991 | Weikel |
| 5,120,080 A | 6/1992 | Ritter |
| 5,141,277 A | 8/1992 | Alexander |
| 5,246,244 A | 9/1993 | Colibert |
| 5,306,037 A | 4/1994 | Robertson |
| D362,224 S | 9/1995 | McCoy et al. |
| 5,449,191 A | 9/1995 | Cattau |
| 5,509,682 A | 4/1996 | Lindenman et al. |
| 5,516,137 A | 5/1996 | Kass et al. |
| 5,529,329 A | 6/1996 | McCoy |
| D376,751 S | 12/1996 | Hanson et al. |
| 5,580,073 A | 12/1996 | Irwin et al. |
| D378,077 S | 2/1997 | Lindenman et al. |
| 5,707,070 A | 1/1998 | Lindenman et al. |
| 5,738,471 A | 4/1998 | Zentner et al. |
| 5,772,229 A | 6/1998 | Cattau |
| 5,839,745 A | 11/1998 | Cattau et al. |
| 5,971,418 A | 10/1999 | Lindenman et al. |
| 6,065,766 A | 5/2000 | Pulliam |
| 6,170,850 B1 | 1/2001 | Works |
| 6,179,316 B1 | 1/2001 | Sibley, Jr. |
| 6,199,889 B1 | 3/2001 | Golembiewski et al. |
| 6,467,791 B1 | 10/2002 | Fandrich et al. |
| 6,502,846 B2 | 1/2003 | Fandrich et al. |
| 6,520,528 B2 | 2/2003 | Fandrich et al. |
| 6,523,841 B2 | 2/2003 | Glaser |
| 6,533,308 B1 | 3/2003 | Tambormino |
| 6,758,921 B1 | 7/2004 | Struebel |
| 6,824,157 B1 | 11/2004 | Putnam |
| 6,851,695 B2 | 2/2005 | Lindenman et al. |
| 6,969,090 B1 | 11/2005 | Works |
| 7,121,573 B2 | 10/2006 | Lindenman et al. |
| 7,264,259 B2 | 9/2007 | Lindenman et al. |
| 7,413,390 B1 | 8/2008 | Allison et al. |
| 7,753,390 B1 | 7/2010 | Mann |
| 7,775,541 B2 | 8/2010 | Linger et al. |
| 7,793,968 B1 | 9/2010 | Withers |
| 7,828,317 B2 | 11/2010 | Withers et al. |
| 8,414,009 B2 | 4/2013 | Stanifer |
| 9,067,468 B2 | 6/2015 | Stanifer et al. |
| 10,967,688 B2 * | 4/2021 | Garner ............ B60D 1/015 |
| 2003/0015855 A1 | 1/2003 | McCoy et al. |
| 2003/0038452 A1 | 2/2003 | Lindenman et al. |
| 2003/0209878 A1 | 11/2003 | Lindenman et al. |
| 2003/0209879 A1 | 11/2003 | Lindenman et al. |
| 2005/0146116 A1 | 7/2005 | Lindenman |
| 2009/0295122 A1 | 12/2009 | Withers et al. |
| 2010/0109285 A1 | 5/2010 | Stanifer et al. |
| 2013/0193671 A1 | 8/2013 | Mccoy |
| 2014/0035257 A1 | 2/2014 | Van |
| 2015/0102584 A1 | 4/2015 | Hartleip |

FOREIGN PATENT DOCUMENTS

| | | |
|---|---|---|
| EP | 1078785 A2 | 2/2001 |
| EP | 1036679 B1 | 8/2004 |
| WO | WO2009030026 A1 | 3/2009 |

OTHER PUBLICATIONS

Cequent Performance Products, Installation Instructions Gooseneck Mounting Kit Chevrolet/GMC 2500/3500 Heavy Duty Short & Long Bed, (Part No. 4456), Apr. 11, 2011, pp. 1-8.

Instruction Sheet No. 63102N, Make/Model(s) Hide-A-Goose, Mar. 26, 2007, 4 pages.

Instruction Sheet No. 50117N, Make/Model(s) Dodge Pick-Ups, 2003-UP 2500, 3500 All Models, Mar. 22, 2007, 3 pages.

Cequent Towing Products, Inc., Operating Instructions Signature Series 5th Wheel Slider Hitch, pp. 1-12, Jan. 23, 2004, Litho in USA.

Cequent Towing Products, Inc., Installation Instructions Mounting Kit GM '99-'07 "Classic" 1500 (LD/HD) and 2500 5'8" & 6'6" Beds Only, Aug. 29, 2008, 10 pages, Litho in USA.

Cequent Towing Products, Inc., Installation Instructions Mounting Kit Ford 2004—Current F150 5.5', 6' and 8' Beds, 11 pages, Aug. 21, 2008, Litho in USA.

Cequent Towing Products, Inc., Assembly Instructions Signature Series 24K 5th Wheel Hitch, pp. 1-11, Jan. 28, 2004, Litho in USA.

Draw-Tite Catalog 2004, 7 pages.

Draw-Tite Catalog 2005, 7 pages.

Draw-Tite Catalog 2006, 5 pages.

Draw-Tite Catalog, 2007, 6 pages.

Draw-Tite Catalog, 2008, 3 pages.

Reese Catalog, 2004, 8 pages.

Reese Catalog, 2005, 9 pages.

Reese Catalog, 2006, 6 pages.

(56) References Cited

OTHER PUBLICATIONS

Reese Catalog, 2007, 7 pages.
Reese Catalog, 2008, 5 pages.
Cequent Towing Products, Inc., Operating Instructions Signature Series 5th Wheel Slider Hitch, pp. 1-12, Dec. 13, 2004, Litho in USA.
Cequent Towing Products, Inc., Assembly Instructions Signature Series 5th Wheel Slider Hitch, pp. 1-16, Nov. 23, 2004, Litho in USA.
Cequent Towing Products, Inc., Assembly Instructions Signature Series 5th Wheel Slider Hitch, pp. 1-16, Jan. 5, 2004, Litho in USA.
Cequent Towing Products, Inc., Assembly Instructions Signature Series 16K 5th Wheel Hitch, pp. 1-11, Mar. 15, 2005, Litho in USA.
Cequent Towing Products, Inc., Assembly Instructions Signature Series 24K 5th Wheel Hitch, pp. 1-11, Dec. 13, 2004, Litho in USA.
Cequent Towing Products, Inc., Operating Instructions Signature Series 16K 5th Wheel Hitch, pp. 1-9, Dec. 14, 2004, Litho in USA.
Cequent Towing Products, Inc., Assembly Instructions Signature Series Gooseneck, pp. 1-14, Oct. 13, 2006, Litho in USA.
Cequent Towing Products, Inc., Assembly Instructions Signature Series 24K 5th Wheel Hitch, pp. 1-11, Jun. 15, 2006, Litho in USA.
Cequent Towing Products, Inc., Assembly Instructions Signature Series 24K 5th Wheel Hitch, pp. 1-11, May 21, 2008, Litho in USA.
Cequent Towing Products, Inc., Assembly Instructions Signature Series 5th Wheel Slider Hitch, pp. 1-17, Jun. 2, 2004, Litho in USA.
Cequent Towing Products, Inc., Operating Instructions Signature Series 24K 5th Wheel Hitch, pp. 1-9, Mar. 15, 2005, Litho in USA.
Cequent Towing Products, Inc., Operating Instructions Signature Series 24K 5th Wheel Hitch, pp. 1-9, May 21, 2008, Litho in USA.
Cequent Towing Products, Inc., Operating Instructions Signature Series 24K 5th Wheel Hitch, pp. 1-9, Dec. 14, 2004, Litho in USA.
Cequent Towing Products, Inc., Operating Instructions Signature Series 24K 5th Wheel Hitch, pp. 1-9, Aug. 20, 2007, Litho in USA.
Cequent Towing Products, Inc., Assembly Instructions Signature Series 24K 5th Wheel Hitch, pp. 1-11, Jan. 6, 2006, Litho in USA.
Cequent Towing Products, Inc., Operating Instructions Signature Series 24K 5th Wheel Hitch, pp. 1-9, Jan. 28, 2004, Litho in USA.
Cequent Towing Products, Inc., Assembly Instructions Signature Series 5th Wheel Slider Hitch, pp. 1-17, Jan. 24, 2007, Litho in USA.
Cequent Towing Products, Inc., Operating Instructions Signature Series 5th Wheel Slider Hitch, pp. 1-12, Aug. 20, 2007, Litho in USA.
Cequent Towing Products, Inc., Operating Instructions Signature Series 5th Wheel Slider Hitch, pp. 1-12, Jan. 25, 2007, Litho in USA.
International Search Report for International App. No. PCT/US2011/063922 dated May 8, 2012.
International Searching Authority, European Patent Office, International Search Report for International App. No. PCT/US2017/029245 dated Sep. 22, 2017.
International Searching Authority, European Patent Office, International Search Report for International App. No. PCT/US2018/020421 dated Jun. 11, 2018.

* cited by examiner

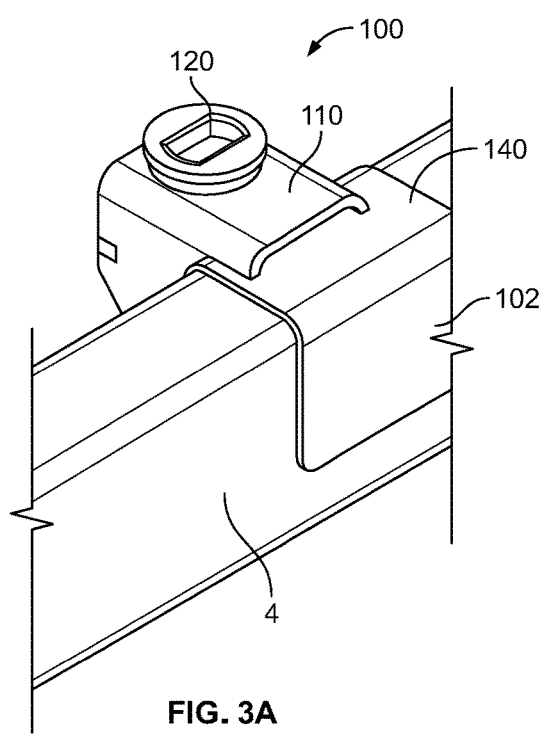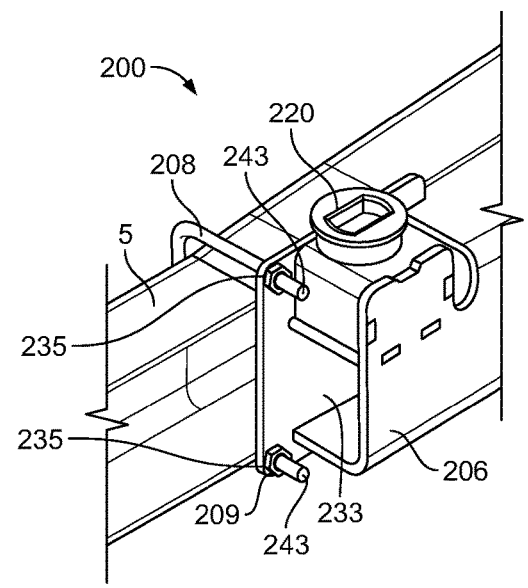
FIG. 3A
FIG. 3B

MULTI-POINT UNDERBED HITCH MOUNTING SYSTEM

CROSS REFERENCE TO RELATED APPLICATIONS

This application is a continuation of U.S. patent application Ser. No. 15/909,236, filed on Mar. 1, 2018, and entitled "MULTI-POINT UNDERBED HITCH MOUNTING SYSTEM;" which claims priority to U.S. Patent Application Ser. No. 62/465,353, filed on Mar. 1, 2017, and entitled "MULTI-POINT UNDERBED HITCH MOUNTING SYSTEM," the disclosures of each of which are incorporated herein by reference in their entireties.

TECHNICAL FIELD

The present disclosure is generally related to a towing apparatus and, more particularly, to multi-point under bed hitch mounting system attachable to a frame of a towing vehicle.

BACKGROUND

Many vehicles are designed to transport freight, goods, merchandise, personal property, and other such cargo. Often, a hitch assembly is utilized to connect a towed vehicle or trailer to a towing vehicle, such as a truck for example, to increase the capacity to transport goods. Many types of coupling devices have been developed for providing this connection between a towing vehicle and a towed vehicle.

It is well known to utilize a trailer hitch to connect a trailer to a towing vehicle. There are many different types of trailer hitches that may be attached to the towing vehicle in a variety of ways, depending on the type of hitch to be used. Some of the most common types of hitches include gooseneck, fifth wheel, front mount, and the like. Often, the type of hitch used to connect a trailer and a vehicle is determined by the size, shape and other features of the trailer. For example, large trailers such as semi trailers and campers often require a fifth wheel hitch, whereas, small and mid-sized trailers, such as boat trailers, are better suited for gooseneck trailer hitches.

Due to the size and weight of many trailers, it is preferable to evenly balance and distribute the weight of the trailer over the wheels of the towing vehicle. This is best accomplished by connecting the hitch to the frame or base of the towing vehicle, near the vehicle's center of gravity.

Accordingly, hitches mounted to the load bed of trucks and other vehicles connect to the vehicle's frame. Generally speaking, past systems relied on single piece or parallel mounting permanently fixed to the underside of the vehicle. To ensure strength and stability, these frames spanned transversely across the underside of the vehicle to connect to the longitudinal rails of the frame. In particular, many mounting systems used parallel transverse rails, an H-shape member, or an integral single member. In all cases, these mounting systems attach to towing or other apparatus via one or more apertures formed in the load bed of the vehicle. Examples of such under-bed mounting connections can be found in U.S. Pat. Nos. 7,793,968; 7,828,317; 8,414,009; 9,067,468; and 9,150,067 (all of which are incorporated by reference herein).

One disadvantage of disposing substantial portions of the mounting apparatus under the truck bed is that these systems are comparatively difficult to access and inspect (excepting, of course, for the connection point provided through the truck bed).

Another potential issue can be the fixed yet variable distance between the frame rails of different makes of vehicles. That is, the distance between the longitudinal rails of the frame may vary depending on the type of vehicle. Further, some vehicles may utilize curving or C-shaped rails, which may not be amenable to incorporating single piece, integral mounts and/or conventional H-shaped mounts wherein the transverse legs have fixed distances and/or attachment points.

In view of these shortcomings, a system and method that allow for a multi-point mounting system with increased under carriage clearance would be welcome. Further, a mounting system that is adaptable to vehicles with box frames or C-frames is needed.

SUMMARY

A hitch mounting system relying on a pair of mirror-image brackets is contemplated. The brackets may be mounted over or completely around the frame of a vehicle, depending upon whether the vehicle possesses a box frame or a C-frame. Each bracket comprises a plurality of mounting points that may accept quick disconnect direct-to-puck assemblies. The mounting points are disposed longitudinally from one another by a beam. The bracket may be formed from a completely or partially enclosed tube or beam with a polygonal transverse cross section including at least two, and preferably three or four, flat surfaces. At least one of the flat surfaces engages the longitudinal rails, with the longitudinal rails of box framed vehicles engaging three separate flattened surfaces. A C-shaped extension member may optionally be fastened to one of the vertically flat surfaces to serve as a connector to vehicles with C-frames.

An under bed hitch mounting apparatus is shown and described. The under bed hitch mounting apparatus may comprise a first bracket attachable to a frame of a vehicle below a load bed of the vehicle and a second bracket attachable to the frame of the vehicle below a load bed of the vehicle, the second bracket transversely spaced from the first bracket. The under bed hitch mounting apparatus may also include a first receiving member attached with the first bracket, the first receiving member configured to engage an accessory member, where at least a portion of the first receiving member extends above the load bed of the vehicle, and a second receiving member attached with the second bracket, the first receiving member configured to engage the accessory member, where at least a portion of the second receiving member extends above the load bed of the vehicle.

The under bed hitch mounting apparatus may also include any of the following, including any one or more of the following:

first and second mounting platforms, wherein the first and second mounting platforms extend from the first bracket;

where the first receiving member comprises a first pair of receiving members and where a first receiving member of the first pair of receiving members is attached with the first mounting platform and a second receiving member of the first pair of receiving members is attached with the second mounting platform;

third and fourth mounting platforms, wherein the third and fourth mounting platforms extend from the second bracket;

where the second receiving member comprises a second pair of receiving members whereby a first receiving member of the second pair of receiving members is attached with the third mounting platform and a second receiving member of the second pair of receiving members is attached with the fourth mounting platform;

where the first and second brackets are an inverted U-shape where three sides of the first and second brackets are configured to circumscribe at least a portion of the frame of the vehicle;

first and second extension bars, where the first extension bar engages the first bracket attaching the first bracket with the frame of the vehicle and wherein the second extension bar engages the second bracket attached the second bracket with the frame of the vehicle;

where the first and second extension bars are generally C-shaped to circumscribe at least a portion of the frame of the vehicle;

third and fourth extension bars, where the third extension bar engages the first bracket attaching the first bracket with the frame of the vehicle and wherein the fourth extension bar engages the second bracket attached the second bracket with the frame of the vehicle;

where the third and fourth extension bars are generally C-shaped to circumscribe at least a portion of the frame of the vehicle;

where the first bracket includes first and second plate members;

where the first plate member includes a first mating member and the second plate member includes a second mating member where the first and second mating members when aligned in a mating configuration position the first and second plate members in an operative position to be attached together;

where the first mating member comprises a tab and the second mating member comprises a notch of a shape and size generally corresponding to the tab;

where the first mounting platform includes first and second mounting platform plate members;

where the first mounting platform plate member includes a first mating member and the second mounting platform plate member includes a second mating member whereby the first and second mating members when aligned in a mating configuration position the first and second mounting platform plate members in an operative position to be attached together; and/or where the first mating member comprises a tab and the second mating member comprises a notch of a shape and size generally corresponding to the tab.

An under bed hitch mounting apparatus is shown and described. The under bed hitch mounting apparatus may include a bracket attachable to a frame of a vehicle below a load bed of the vehicle, and a mounting platform positioned generally perpendicular with and attached to the bracket. The hitch mounting apparatus may also include a receiving member attached with the mounting platform, the receiving member configured to engage an accessory member, where at least a portion of the receiving member extends above the load bed of the vehicle.

The under bed hitch mounting apparatus may also include any of the following, including any one or more of the following:

a second mounting platform positioned generally perpendicular with and attached to the bracket, and a second receiving member attached with the second mounting platform, the second receiving member configured to engage the accessory member, wherein at least a portion of the second receiving member extends above the load bed of the vehicle;

Where the receiving member comprises a plate member having an aperture and a tubular member with an opening, whereby the tubular member is inserted into the aperture;

where the opening is configured to selectively secure a leg of a fifth wheel hitch to the receiving member;

where the plate member includes a tab and the mounting platform includes a slot whereby the tab engages the slot operatively positioning the plate member relative to the mounting platform; and/or where the plate member includes a second tab and the bracket includes a bracket slot whereby the second tab engages the bracket slot operatively positioning the plate member relative to the bracket.

Specific reference is made to the appended claims, drawings, and description below, all of which disclose elements of the invention. While specific embodiments are identified, it will be understood that elements from one described aspect may be combined with those from a separately identified aspect. In the same manner, a person of ordinary skill will have the requisite understanding of common processes, components, and methods, and this description is intended to encompass and disclose such common aspects even if they are not expressly identified herein.

DESCRIPTION OF THE DRAWINGS

Operation of the present teachings may be better understood by reference to the detailed description taken in connection with the following illustrations. These appended drawings form part of this specification, and any written information in the drawings should be treated as part of this disclosure. In the same manner, the relative positioning and relationship of the components as shown in these drawings, as well as their function, shape, dimensions, and appearance, may all further inform certain aspects of the invention as if fully rewritten herein.

In the drawings:

FIG. 3A is perspective sectional view of the under bed hitch mounting apparatus of FIG. 1.

FIG. 3B is perspective sectional view of the under bed hitch mounting apparatus of FIG. 2.

DETAILED DESCRIPTION

Reference will now be made in detail to exemplary embodiments of the present disclosure, examples of which are illustrated in the accompanying drawings. It is to be understood that other embodiments may be utilized and structural and functional changes may be made without departing from the respective scope of the present disclosure. As such, the following description is presented by way of illustration only and should not limit in any way the various alternatives and modifications that may be made to the illustrated embodiments and still be within the spirit and scope of the present disclosure.

As used herein, the words "example" and "exemplary" mean an instance, or illustration. The words "example" or "exemplary" do not indicate a key or preferred aspect or embodiment. The word "or" is intended to be inclusive rather an exclusive, unless context suggests otherwise. As an example, the phrase "A employs B or C," includes any inclusive permutation (e.g., A employs B; A employs C; or A employs both B and C). As another matter, the articles "a" and "an" are generally intended to mean "one or more" unless context suggest otherwise.

Figure 1:
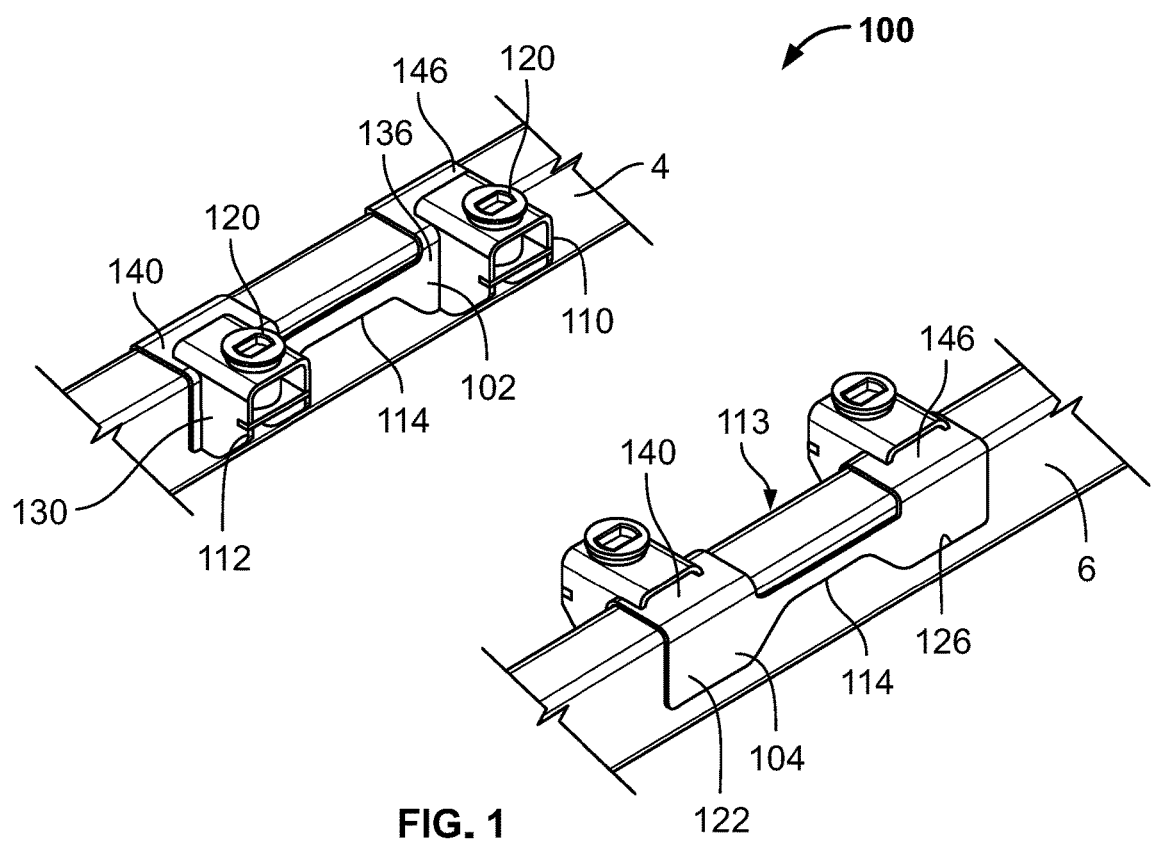
FIG. 1 is a perspective plan view of an under bed hitch mounting apparatus according to certain aspects as disclosed herein.

With reference to FIG. 1, an under bed hitch mounting apparatus 100 comprises first or left bracket 102 and second or right bracket 104. It will be understood that brackets 102, 104 are substantially mirror images of one another, so that the description of one may be applied to both brackets accordingly. While they are described as mirror images there may be slight differences between the brackets, such as through manufacturing tolerances, adjustments based on the frame to which the applicable bracket 102, 104 attaches (e.g., a fastener may be positioned on the frame so that a slight variation in the one the brackets is required) and such other similar reasons, which are far too exhaustive to be included herein. As such, the brackets 102, 104 are substantially mirror images of one another. The brackets 102, 104 may be formed of steel or other appropriate metals and/or alloys. The brackets 102, 104 may be configured to be operatively positioned on opposing sides of a frame of a towing vehicle. The brackets 102, 104 obviate the need to include any transverse member therebetween. The brackets 102, 104 are free from direct attachment between each other. In other words, there is no intervening component attached between or otherwise attaching the brackets 102, 104 together when they are operatively positioned on the frame of the towing vehicle 5 and positioned below the load bed 7 thereof. The brackets 102, 104 are independently attached to the frame of the towing vehicle 5.

Mounting platforms 110, 112 may be formed at longitudinally opposed ends of each bracket 102, 104. A total of four mounting platforms 110, 112 may be utilized on the brackets 102, 104, i.e., each mounting bracket 102, 104 may include a pair of mounting platforms 110, 112. The mounting platforms 110, 112 may be generally perpendicular with the mounting brackets 102, 104, e.g., they may be between 80-110 degrees to the mounting brackets 102, 104. These platforms 110, 112 may be added as weldments or as monolithic items that are cast, forged, or otherwise provided as a unitary part of the bracket 102, 104. In some embodiments, the platforms 110, 112 may be integrated with the top surface of the bracket immediately above where it engages the rails 4, 6 (a portion of which are shown in the drawings). The rails 4, 6 may comprise a portion of the frame system of the towing vehicle. There is no limit to the configuration of the rails 4, 6. Those shown herein are merely exemplary and the present teachings are not limited to be used with this configuration. Any configuration of the rails 4, 6 may be utilized.

A receiving member 120, such as a direct-to-puck receptacle, quick disconnect, or other similar connection port, are disposed on or integrated with the platforms 110, 112. The receiving member 120 may include the puck described in U.S. Pat. No. 7,121,537, which is hereby incorporated by reference. This results in the under bed hitch mounting apparatus 100 having four receiving members 120. When the brackets 102, 104 are affixed to the longitudinal box rails 4, 6 of the vehicle, the receiving member 120 may generally align with apertures formed in the truck or load bed 7 of the vehicle 5. Generally speaking, the mechanism 120 cooperates with a corresponding towing component(s), such as a leg of a fifth wheel receiver platform, an above-bed hitch mounting mechanism, safety chain tie down member, or other similar items. Examples of the mounting mechanism are disclosed in U.S. patent application Ser. No. 15/459,034, which is incorporated herein by reference. In such embodiments, the under bed hitch mounting apparatus 100 may include four receiving members 120, which may be positioned in four corresponding apertures in the load bed 7 of the towing vehicle 5. The receiving members 120 may generally hide the apertures in the load bed 7 when the under bed mounting apparatus 100 is operatively installed.

Brackets 102, 104 may be formed in a generally inverted U-shape. In this manner, three generally flattened surfaces may be spaced to engage the longitudinal rails 4, 6. In some aspects, the downward extending legs 122, 126 (only shown on bracket 104 in FIG. 1) of the U-shaped brackets 102, 104 can protrude beyond the bottom edge of the rails 4, 6 so that a fastener may attach along the bottom (not shown). Additional fasteners or adhesives (not shown) may be disposed on, in, or between the rail and the bracket to improve engagement. Still further, the U-shaped brackets 102, 104 may be welded to the longitudinal rails 4, 6. Specifically, a front portions 130, 136 (only shown on bracket 102, but also included on bracket 104), and/or a top portion 140, 146 (shown on both brackets 102, 104) may be welded to otherwise attached with the rails 4, 6.

A top facing portion 113 of the brackets 102, 104 may be open to reduce material use. Thus, only midpoint connections beams 114 maintain connection and spacing of the mounting platforms 110, 112. The midpoint connection beams 114 may also be welded and/or otherwise attached with the rails 4, 6.

Additional embodiments of an under bed hitch mounting apparatus according the present teachings are described below. In the descriptions, all of the details and components may not be fully described or shown. Rather, the features or components are described and, in some instances, differences with the above-described embodiments may be pointed out. Moreover, it should be appreciated that these additional embodiments may include elements or components utilized in the above-described embodiments although not shown or described. Thus, the descriptions of these additional embodiments are merely exemplary and not all-inclusive nor exclusive. Moreover, it should be appreciated that the features, components, elements and functionalities of the various embodiments may be combined or altered to achieve a desired under bed hitch mounting apparatus without departing from the spirit and scope of the present teachings.

Figure 2:
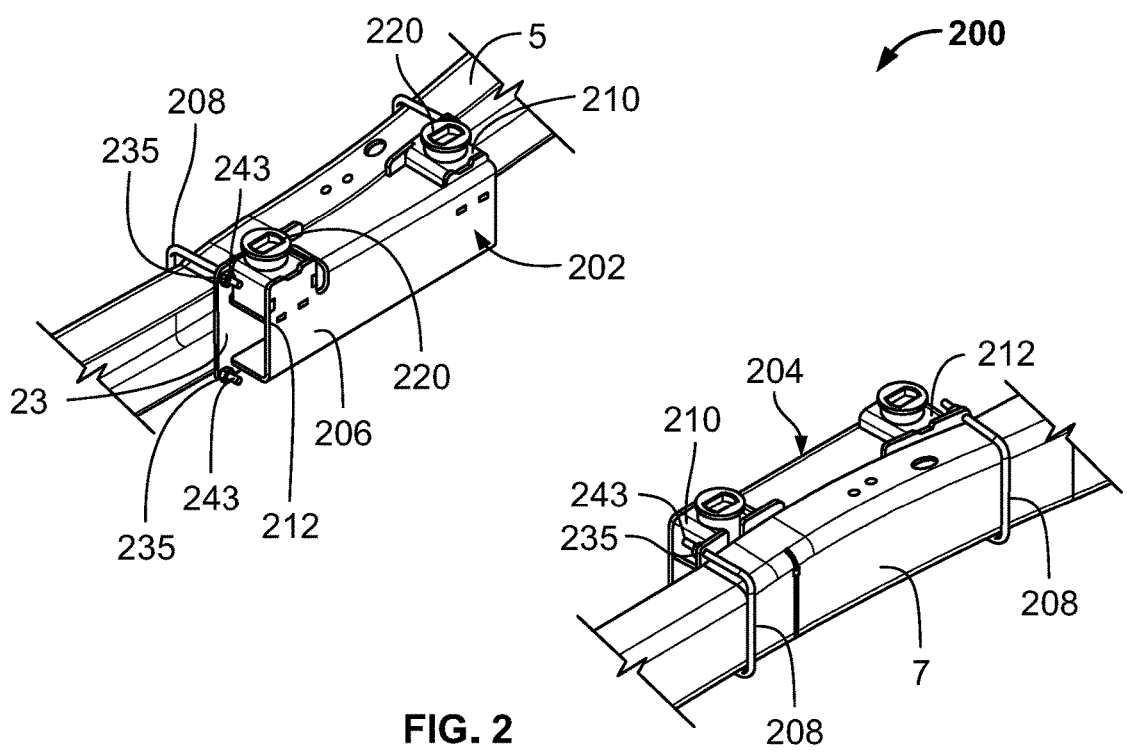
FIG. 2 is a perspective plan view of the under bed hitch mounting apparatus according to certain aspects specific as disclosed herein.

As shown in FIG. 2, is another embodiment of an under bed hitch mounting apparatus 200. In this embodiment, the under bed hitch mounting apparatus may be formed from a completely closed (or substantially closed, e.g., between 75%-99% closed), and preferably hollow, members 206. Similar to above, the under bed hitch mounting apparatus 200 may include separate first or right and second or left brackets 202, 204. Also as similar to the above, the members 206 may be steel, metal, and/or other appropriate alloys that are forged, cast, or other formed.

As shown in FIG. 2, the mounting platforms 210, 212 for the receiving members 220 may be integrally formed on the top flattened section of member 206. A vertical side wall 233 of the member 206 (as shown for bracket 202, but is also in bracket 204) may include apertures 235 or other attachment points for a generally C-shaped side extension bar 208. Extension bar 208 may be formed to engage C-frame longitudinal rails 5, 7. The horizontal, transversely extending legs 243 of the extension bar 208 may include optional adjustable attachments 209, such as a nut and/or screw fitting, to allow for a gap between a portion of the bracket 202, 204 and its corresponding rail 5, 7. In this manner, the necessary spacing for the receiving members 220 can be maintained relative to one another even when the rails 5, 7 may not be perfectly parallel or do to other tolerance issues. Extension bars 208 may be fastened or attached to the rails 5, 7 independently from their connection to the brackets 202, 204 or dependent thereupon.

Member 206 is shown as a continuous polygonal tube with four major, flat surfaces. However, portions of one or more surfaces of the member 206 may be removed. It is also possible to incorporate member 206 with only two or three major surfaces (e.g., a transversely disposed L-, C-, or U-shape). The member could also be formed as an I- or a T-beam. Protruding mounting platforms, as shown in FIG. 1, could also be incorporated.

In both aspects, it is preferable for the location of the under bed hitch mounting apparatus 100, 200 to be generally symmetric, so that all attachment points are inside, on, or outside of the frame rails. Also, as noted above, the receiving members must cooperate with appropriate apertures in the vehicle bed so as to allow the towing components to be received by the mounting apparatus. Further still, the brackets 102, 104, 202, 204 should be properly aligned to distribute the vertical, longitudinal, and transverse compression and tension created by any attached components (and the loads associated therewith) across the vehicle frame as equally and/or evenly as is feasible.

Normally, only two brackets are needed to accomplish mounting of most towing components. Nevertheless, additional brackets could be added for components requiring an even greater number of connection points. In all instances, the lack of transverse rails along the underside of the vehicle improves the overall clearance/profile for that vehicle. In an exemplary embodiment of such, the under bed hitch mounting apparatus 200 may include four receiving members 220, which may be positioned in four corresponding apertures in the load bed 7 of the towing vehicle 5. The receiving members 220 may generally hide the apertures in the load bed 7 when the under bed mounting apparatus 200 is operatively installed.

Figure 4:
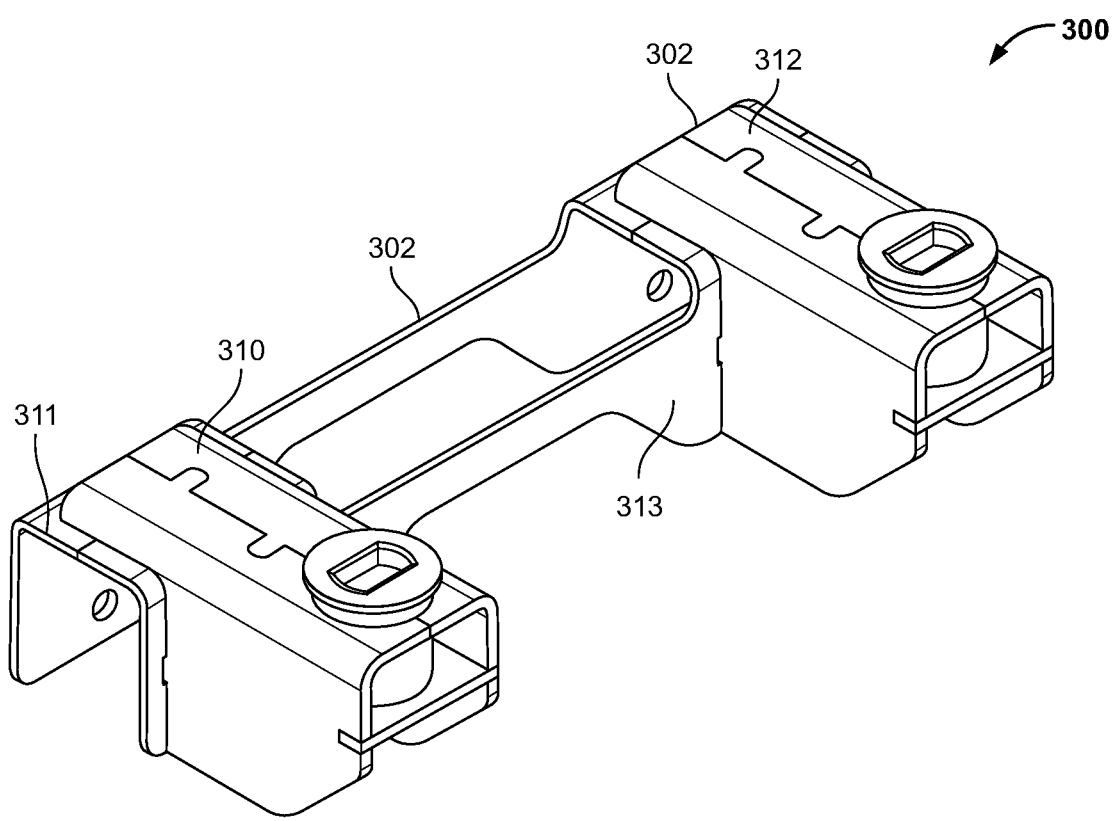
FIG. 4 is a perspective view of an embodiment of an under bed hitch mounting apparatus.

A further embodiment of an under bed hitch mounting apparatus 300 is shown in FIG. 4. In this embodiment, the under bed hitch mounting apparatus 300 include a left or first bracket 302 and second or right bracket (not shown, but contemplated hereby). It will be understood that brackets 302 may be substantially mirror images of one another, so that the description of one may be applied to both brackets accordingly. While they are described as mirror images there may be slight differences between the brackets, such as through manufacturing tolerances, adjustments based on the frame to which the applicable bracket 302 attaches (e.g., a fastener may be positioned on the frame so that a slight variation in the one the brackets is required) and such other similar reasons, which are far too exhaustive to be included herein. As such, the brackets 302 are substantially mirror images of one another. The brackets 302 may be formed of steel or other appropriate metals and/or alloys.

Figure 5:
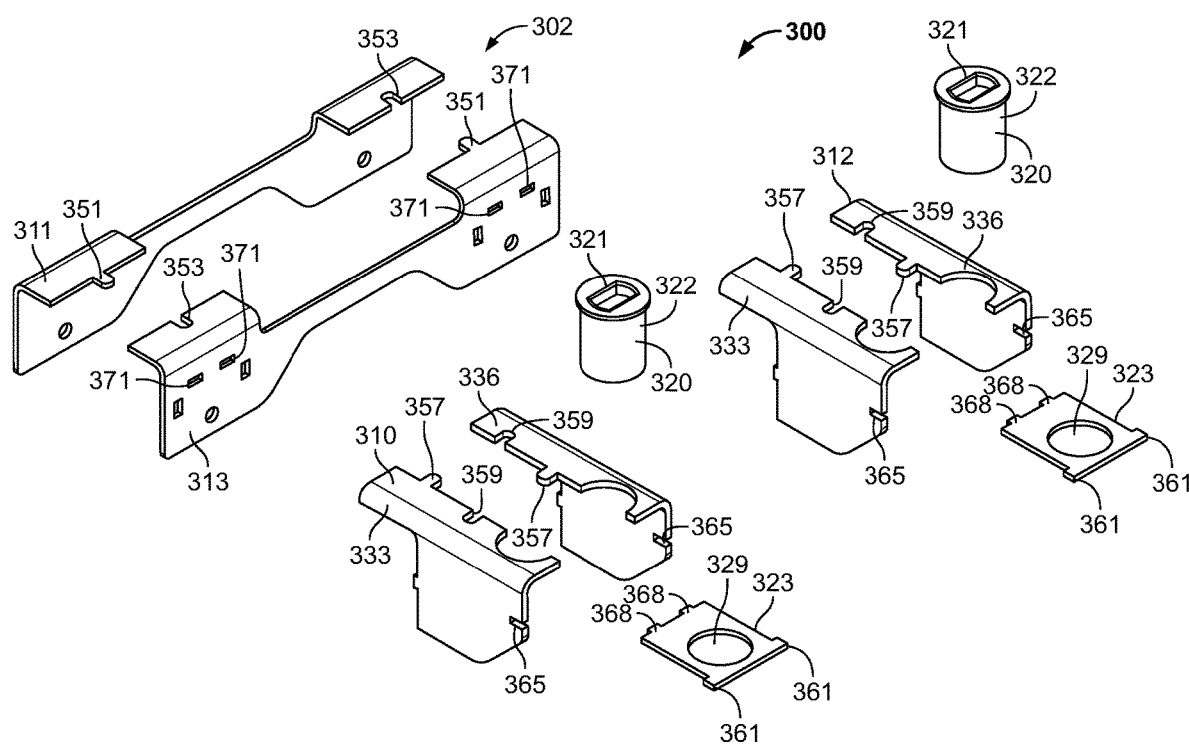
FIG. 5 is an exploded view of an embodiment of an under bed hitch mounting apparatus.

The brackets 302 may be formed from two separate components 311 and 313, which may make manufacture thereof easier. In such embodiments, the two separate components 311, 313 may be formed separately and then welded together to for the brackets 302. The two separate components 311, 313 may comprise first and second plate members 311, 313 that are bent into the appropriate configuration as shown for example in FIG. 5. Each or one of the brackets 302 may be formed in this manner. Each component or side 311, 313 may include mating members 351 and 353 capable of mating engagement with one another. An exemplary embodiment of such is shown in FIG. 3 as tabs 351 and notches 353. While a generally half-oval shaped tab and notch are shown, the present teachings contemplate any kind of matingly engaging components, e.g., semi-circular tab and notch, square tab and notch, rectangular tab and notch, etc. The mating members 351 and 351 help position the components 311, 313 in an operative position so that they may be welded or otherwise attached together. While one of the components 311 is shown as having one tab 351 and one notch 353 and the other component is similarly shown with one tab 351 and one notch 353, the present teachings are not limited to this configuration. Any number of mating members 351, 353 may be utilized with each of the components 311, 313. For example, there could be one set of mating members 351, 353, two as shown, three, four, five, etc. In some embodiments, one of the components 311 may include only mating 351 while the other component 313 may include only mating members 353. The components 311, 313 may have a mix where they each contain mating members 351 and 353 or component 311 may only contain mating members 353 and component 313 may only contain mating members 351. Any variation of these configurations is contemplated hereby.

The under bed hitch mounting apparatus 300 may comprise mounting platforms 310, 312, which may be similar to mounting platforms 110, 112. The mounting platforms 310, 312 may be formed similar to the brackets 302, i.e., they may be formed from two mounting platform components 333, 336, whereby there are a total of four such mounting platforms 310, 312. The two mounting platform components 333, 336 of each mounting platform 310, 312 may be of a generally similar configuration. The mounting platform components 333, 336 may each comprise mounting platform plate members that are bent into mating shapes, such as those shown in FIG. 5. There may be four such mounting platform plate members 333, 336. These mounting platform components 333, 336 may include platform mating members 357 and 359 capable of mating engagement with one another. An exemplary embodiment of such is shown in FIG. 3 as tabs 357 and notches 359. While a generally half-oval shaped tab and notch are shown, the present teachings contemplate any kind of matingly engaging components, e.g., semi-circular tab and notch, square tab and notch, rectangular tab and notch, etc. The platform mating members 357 and 359 help position the mounting platform components 333, 336 in an operative position so that they may be welded or otherwise attached together. While both of the mounting platform components 333, 336 is shown as having one tab 357 and one notch 359, the present teachings are not limited to this configuration. Any number of mating members 357, 359 may be utilized with each of the mounting platform components 333, 336. For example, there could be one set of mating members 357, 359, two as shown, three, four, five, etc. In some embodiments, one of the mounting platform components 333, 336 may include only mating 357 while the other of the mounting platform components 333, 336 may include only mating members 359. The mounting platform components 333, 336 may have a mix where they each contain mating members 357 and 359 or one of the mounting platform components 333, 336 may only contain mating members 359 and the other of the mounting platform components 333, 336 may only contain mating members 357. Any variation of these configurations is contemplated hereby.

Mounting platforms 310, 312 may be formed at longitudinally opposed ends of each of the brackets 302. A total of four mounting platforms 310, 312 may be utilized on the brackets 302, i.e., each mounting bracket 302 may include a pair of mounting platforms 310, 312. These platforms 310, 312 may be added as weldments or otherwise attached such as through fastening.

The under bed hitch mounting apparatus 300 may comprise a plurality of receiving members 320, such as a direct-to-puck receptacle, quick disconnect, or other similar connection port to attach thereto other accessories such as a leg of a fifth wheel hitch. The receiving members 320 may all be of substantially identical construction save for certain manufacturing tolerances or specific design choices. The receiving members 320 may be disposed on or integrated with the platforms 310, 312. By way of a non-limiting example, the under bed hitch mounting apparatus 300 may have four receiving members 320. When the brackets 302 are affixed to the longitudinal box rails of the vehicle, the receiving member 320 may generally align with apertures formed in the truck or load bed 7 of the towing vehicle 5. Generally speaking, the receiving member 320 cooperates with a corresponding towing component(s), such as a leg of a fifth wheel receiver platform, an above-bed hitch mounting mechanism, safety chain tie down member, or other similar items. As shown, the receiving member 320 may comprise a slotted opening 321 with a generally tubular body 322 extend from the slotted opening 321. Any kind of locking or engaging device may be included within the tubular body 322 to engage and lock a corresponding locking device. Examples of which are disclosed in U.S. Pat. No. 7,121,573, which is hereby incorporated by reference. The slotted opening 321 may be configured to accept a leg of a fifth wheel hitch, an above-bed hitch mounting mechanism, safety chain tie down member, or other similar items.

The receiving member 320 may include plate member 323 which may be attached between the mounting platform components 333, 336. In some embodiments, the plate member 323 may include an aperture 329 through which the tubular body 322 may pass and to which may be attached the tubular body 322. In some embodiments, the plate member 323 may be welded to each of the mounting platform components 333, 336 and the tubular body 322. Alternatively or in addition, the plate member 323 may be fastened to each of the mounting platform components 333, 336 and the tubular body 322.

In some embodiments, the plate member 323 may include tabs 361 that extend therefrom. The plate member 323 may include a pair of tabs 361 as shown or may include any number of such. The tabs 361 may be configured to engage mating slots 365 in the mounting platform components 333, 336. The engagement of the tabs 361 with the slots 365 may put the plate member 323 in an operative position relative to the mounting platform components 333, 336. While it is shown that the tabs 361 are on the plate members 323, the present teachings are not limited to such. The opposite may be true, the tabs 361 may be on the mounting platform components 333, 336 and the slots 365 positioned on the plate members 323. Further, while the tabs 361 and slots 365 are shown, any kind of mating engagement members may be utilized without departing from the present teachings.

Further, the plate members 323 may include a second set of tabs 368 that may be configured to engage corresponding slots 371 positioned on at least one of the two components 311, 313. While shown specifically on component 313, the slots 371 could be found on component 311 or on both. In such example, the tabs 368 could be of a size to extend through the slots 371 in the component 313 into slots in the component 311. Alternatively, the tabs 368 may merely engage the slots 371 in component 311. This may further allow the plate members 323 to be operatively positioned with respect to the component 313 in advance of being welded thereto.

In use, the under bed hitch mounting apparatus 300 may be attached to the frame or a portion of the frame, e.g., the rails of a towing vehicle. The under bed hitch mounting apparatus 300 may comprise two mounting brackets 302 (despite only one being shown, the corresponding one would be substantially identical). The under bed hitch mounting apparatus 300 may be positioned such that the receiving member 320 are aligned with openings in the bed of the towing vehicle (or openings may be formed over the receiving members 320). An accessory member, such as for example, a fifth wheel hitch may then be operatively attached in any appropriate manner. For example, legs of a fifth wheel hitch may be positioned in relation to the receiving members 320 (or more specifically, the oval openings 321) and a locking device may selectively lock the legs with the receiving members 320 or more specifically to the under bed hitch mounting apparatus 300 so that the towing vehicle is ready to two a fifth wheel hitch device such as a trailer.

One potential benefit of either or both of the under bed hitch mounting apparatuses 100, 200 and 300 described above is that they can be operatively attached to the frame of the vehicle without the need for any kind of cross rail member or other transversely extending device or member. In other words, the brackets 102, 104 (202, 204 and 302) may be attached to the frame of the towing vehicle 5 without needing an intervening transverse member or cross rail type member attaching the two brackets 102, 104 (202, 204 and 302 and its other bracket) directly together. Other prior art versions require a cross rail (i.e., a rail extending transversely across the vehicle or stated another way extending perpendicular to the direction of travel of the towing vehicle). For those vehicles that do not have room for a cross rail or other similar transversely extending device to be positioned below the load bed of the vehicle, the under bed hitch mounting apparatus 100, 200 and 300 can be used to provide an under bed hitch mounting apparatus to which a fifth wheel hitch or similar device may be operatively attached.

Figure 6:
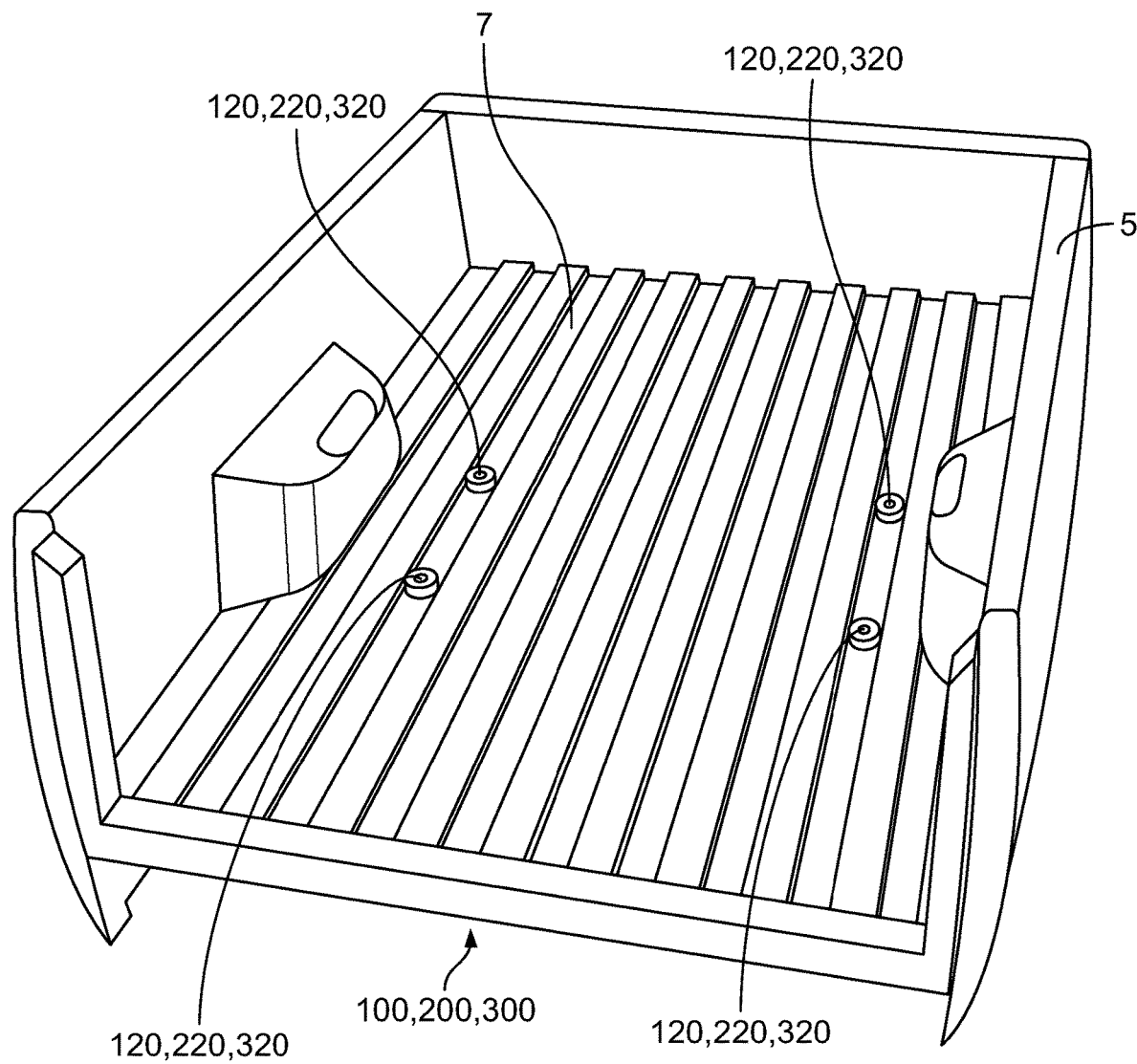
FIG. 6 is a perspective view of a portion of a towing vehicle with an under bed hitch mounting apparatus as disclosed herein operatively attached.

As shown in FIG. 6, any of the above-disclosed embodiments of the under bed hitch mounting apparatus 100, 200 and 300 may be operatively attached to a towing vehicle 5. The under bed hitch mounting apparatus 100, 200, 300 may be installed substantially below a load bed 7 of the towing vehicle 5 whereby only the receiving members 120, 220 and 320 are visible from the load bed 7.

Figure 7:
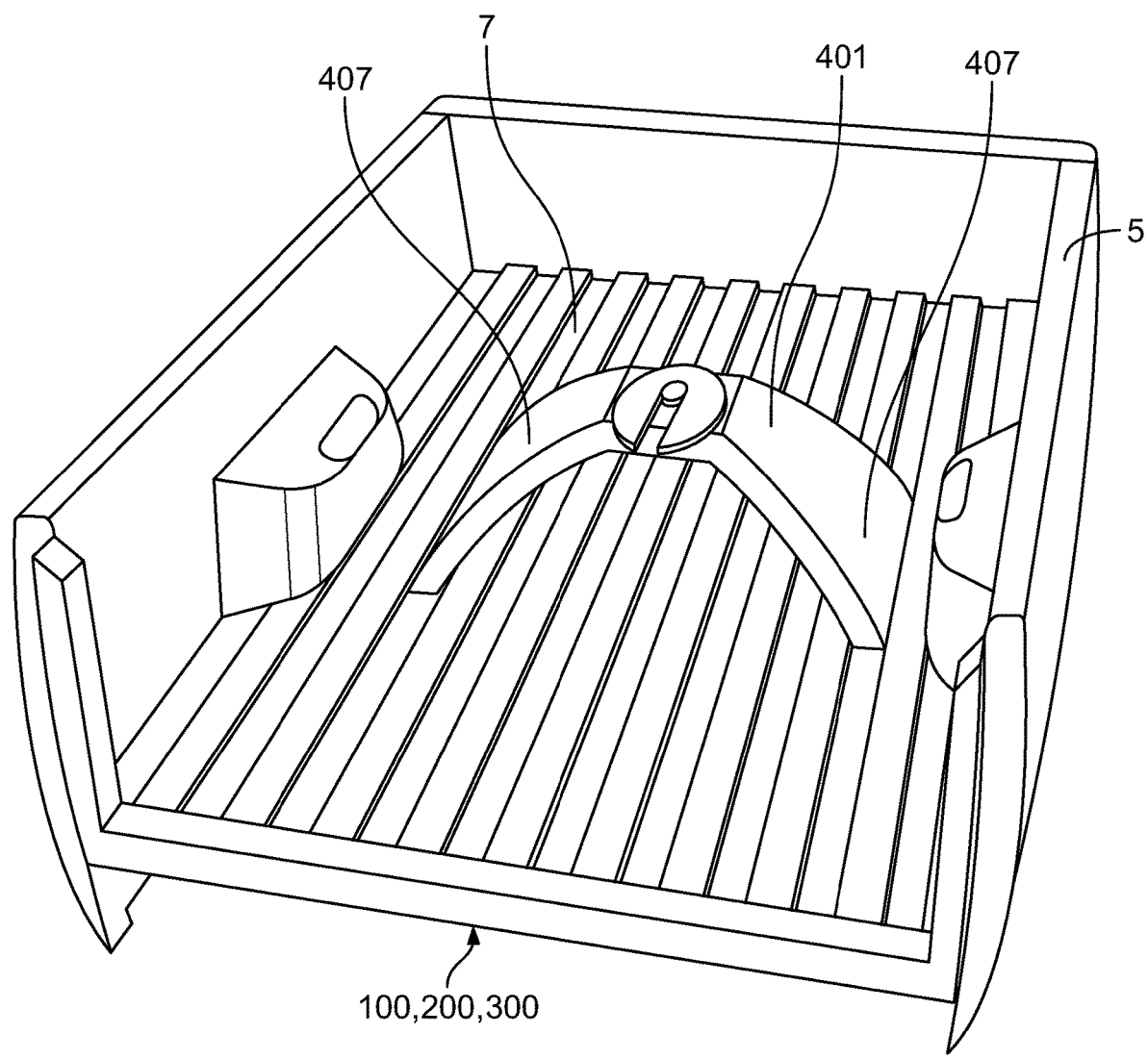
FIG. 7 is a perspective view of a portion of a towing vehicle with an exemplary fifth wheel hitch operatively attached with the under bed hitch mounting apparatus disclosed herein.

As shown in FIG. 7, an exemplary fifth wheel hitch 401 may be operatively attached with any of the exemplary embodiments of the under bed hitch mounting apparatus 100, 200 or 300. The fifth wheel hitch 401 may include a pair of legs 407. The legs 407 may include any kind of locking device, an example of which is disclosed in U.S. Pat. No. 7,121,573. In these embodiments, the legs 407 may include an aperture (for example, the legs 407 may each include two such apertures) through which the locking device may pass. The locking device may then be inserted into the corresponding receiving member 120, 220 or 320 accessible from the load bed 7 of the towing vehicle 5. The locking device may be rotated approximately 90 degrees engaging a portion of the receiving member 120, 220 or 320 selectively securing the locking device to the receiving member 120, 220 or 320. This may selectively secure the leg 407 of the fifth wheel 401 to the under bed hitch mounting apparatus 100, 200 or 300. These steps may be repeated for each of the receiving member 120, 220 or 320.

Although the present embodiments have been illustrated in the accompanying drawings and described in the foregoing detailed description, it is to be understood that the present teachings are not to be limited to just the embodiments disclosed, and numerous rearrangements, modifications and substitutions are also contemplated. The exemplary embodiments have been described with reference to the preferred embodiments, but further modifications and alterations encompass the preceding detailed description. These modifications and alterations also fall within the scope of the appended claims or the equivalents thereof

What is claimed is:

1. An under bed hitch mounting apparatus comprising:
   a first bracket configured to attach to a frame of a vehicle below a load bed of the vehicle;
   a second bracket configured to attach to the frame of the vehicle below the load bed of the vehicle, wherein the first and second brackets are not directly attached to one another;
   a pair of first receiving members attached with the first bracket and configured to engage an accessory member; and
   a pair of second receiving member attached with the second bracket, and configured to engage the accessory member.

2. The under bed hitch mounting apparatus of claim 1, wherein at least a portion of the pair of first and second receiving members extend above the load bed of the vehicle when the first bracket and second bracket are attached to the frame of the vehicle.

3. The under bed hitch mounting apparatus of claim 1 further comprising first and second mounting platforms, wherein the first and second mounting platforms extend from the first bracket.

4. The under bed hitch mounting apparatus of claim 3, wherein a first receiving member of the first pair of receiving members is attached with the first mounting platform and a second receiving member of the first pair of receiving members is attached with the second mounting platform.

5. The under bed hitch mounting apparatus of claim 4, further comprising third and fourth mounting platforms, wherein the third and fourth mounting platforms extend from the second bracket.

6. The under bed hitch mounting apparatus of claim 5, wherein a first receiving member of the second pair of receiving members is attached with the third mounting platform and a second receiving member of the second pair of receiving members is attached with the fourth mounting platform.

7. The under bed hitch mounting apparatus of claim 1 further comprising first and second extension bars, wherein the first extension bar engages the first bracket and is configured to attach the first bracket with the frame of the vehicle and wherein the second extension bar engages the second bracket and is configured to attach the second bracket with the frame of the vehicle.

8. The under bed hitch mounting apparatus of claim 7 further comprising third and fourth extension bars, wherein the third extension bar engages the first bracket and is configured to attach the first bracket with the frame of the vehicle and wherein the fourth extension bar engages the second bracket and is configured to attach the second bracket with the frame of the vehicle.

9. The under bed hitch mounting apparatus of claim 1, wherein the first bracket includes first and second plate members.

10. The under bed hitch mounting apparatus of claim 9, wherein the first plate member includes a first mating member and the second plate member includes a second mating member whereby the first and second mating members when aligned in a mating configuration position the first and second plate members in an operative position to be attached together.

11. An under bed hitch mounting apparatus comprising:
    a bracket configured to be attached to a frame of a vehicle below a load bed of the vehicle;
    a mounting platform positioned generally perpendicular with and attached to the bracket;
    a receiving member positioned on the mounting platform, the receiving member configured to engage an accessory member, wherein the receiving member comprises a plate member having an aperture and a tubular member with an opening, wherein the tubular member is inserted into the aperture.

12. The under bed hitch mounting apparatus of claim 11 further comprising:
    a second mounting platform positioned generally perpendicular with and attached to the bracket;
    a second receiving member positioned on the second mounting platform, the second receiving member configured to engage the accessory member, wherein at least a portion of the second receiving member extends above the load bed of the vehicle.

13. The under bed hitch mounting apparatus of claim 11, wherein at least a portion of the receiving member extends above the load bed of the vehicle.

14. The under bed hitch mounting apparatus of claim 11, wherein the plate member includes a tab and the mounting platform includes a slot whereby the tab engages the slot operatively positioning the plate member relative to the mounting platform.

15. The under bed hitch mounting apparatus of claim 11, wherein the opening is configured to selectively secure a leg of a fifth wheel hitch to the receiving member.

16. An under bed hitch mounting apparatus comprising:
    a first bracket configured to be attached to a frame of a vehicle below a load bed of the vehicle;
    at least one first receiving member engaged with the first bracket and configured to engage an accessory member; and
    wherein the first bracket includes first and second plate members and the first plate member includes a first mating member and the second plate member includes a second mating member whereby the first and second mating members when aligned in a mating configuration position the first and second plate members in an operative position to be attached together.

17. The under bed hitch mounting apparatus of claim 16, wherein at least a portion of the at least one first receiving member extends above the load bed of the vehicle.

18. The under bed hitch mounting apparatus of claim 17 further comprising:
 a second bracket configured to be attached to the frame of the vehicle below the load bed of the vehicle;
 at least one second receiving member engaged with the second bracket, and configured to engage the accessory member, wherein at least a portion of the at least one second receiving member extends above the load bed of the vehicle.

19. The under bed hitch mounting apparatus of claim 18, wherein the second bracket is transversely spaced from the first bracket.

* * * * *